United States Patent
McKillip

[11] 3,904,749
[45] Sept. 9, 1975

[54] HAIR SETTING PREPARATIONS

[75] Inventor: William J. McKillip, Worthington, Ohio

[73] Assignee: Ashland Oil, Inc., Ashland, Ky.

[22] Filed: May 9, 1973

[21] Appl. No.: 358,579

Related U.S. Application Data

[62] Division of Ser. No. 191,802, Oct. 22, 1971, abandoned.

[52] U.S. Cl. .................................... 424/71; 424/70
[51] Int. Cl.² ........................ A61K 7/06; A61K 7/09
[58] Field of Search .......................... 424/70, 71

[56] References Cited
UNITED STATES PATENTS

| | | | |
|---|---|---|---|
| 3,262,917 | 7/1966 | Maeder | 424/71 |
| 3,485,806 | 12/1969 | Bloomquist et al. | 260/80.3 |
| 3,527,802 | 9/1970 | Slagel | 260/561 |

Primary Examiner—Norman A. Drezin

[57] ABSTRACT

Hair setting and conditioning compositions wherein the film forming component is an addition polymerization product consisting of a homo- or copolymer of an aminimide monomer corresponding to the formula:

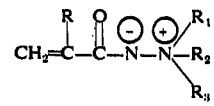

in which R is H or $CH_3$; $R_1$ and $R_2$ are each alkyl; and $R_3$ is alkyl or hydroxyalkyl.

7 Claims, No Drawings

HAIR SETTING PREPARATIONS

CROSS REFERENCE TO RELATED CASES

This application is a division of my copending U.S. patent application Ser. No. 191,802 filed Oct. 22, 1971 and entitled "Hair Setting Preparations", now abandoned.

BACKGROUND OF THE INVENTION

1. Field of the Invention

This invention relates to topical compositions for cosmetically treating human hair.

2. Description of the Prior art

A variety of water soluble film formers have heretofore been proposed by the prior art for use in imparting a temporary set, smooth feel and lustrous appearance to hair. These conditioners have served to overcome, for the most part, the numerous disadvantages associated with the earliest film forming compositions employed for this purpose, typical of which was shellac. Foremost among the deficiencies of a film forming material such as shellac are the total lack of substantivity to hair, brittleness, that is, the poor flexibility exhibited by films thereof, no resetting properties and extreme difficulty of removal from the hair.

As indicated, there have been a number of resinous film formers proposed by the prior art which ostensively possess to one degree or another the properties attributable to a commercially acceptable hair conditioner. The current wide-spread usage, however, of polyvinylpyrrolidone and copolymers thereof in commercial hair conditioning preparations reasonably attests to their representing the present state of this art. Notwithstanding that the polyvinylpyrrolidone type film former has to date enjoyed such universal acceptance, there are certain attendant properties thereof which desirably could be subject to improvement. For one, the polyvinylpyrrolidones are not sufficiently substantive to a hair substrate so as to allow such polymers to be employed in shampoos, dye rinses, and similar hair treating applications to provide improved combout properties.

The polyvinylpyrrolidones, upon being applied in an essentially anhydrous form, yield films which are capable of absorbing moisture from the atmosphere which in turn desirably serves to plasticize the film thus rendering a smooth feel to the hair. However, the hydroscopic properties thereof are such whereby upon any prolonged exposure to atmospheric moisture or upon relatively short exposure under extreme humidity conditions, they develop an objectionable degree of tackiness. This property of becoming tacky is progressive in nature and, irrespective of the humidity conditions experienced, will ultimately result in loss of setting properties.

It is, accordingly, the objective of this invention to provide an improved film forming hair conditioner which, beyond ameliorating the recognized shortcomings of even the best hair conditioners proposed by the prior art, additionally exhibits a novel degree of substantivity to hair.

SUMMARY OF THE INVENTION

In accordance with the present invention dipolar ions in the form of a linear carbon-to-carbon polymeric chain containing a plurality of pendant trialkylammonium acylimine groups have been found to be singularly effective as a film former for conditioning hair.

The resinous conditioners of this invention, more specifically, are the homo- and copolymers of either a trialkylammonium acryloyl- or methacryloylimine. Graphically illustrative of the copolymers useful in the practice of this invention are the polymerization products having the following empirical formula:

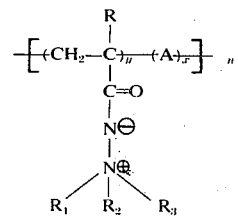

wherein R is H or $CH_3$; $R_1$ and $R_2$ are each alkyl; $R_3$ is alkyl or hydroxyalkyl; and A represents the polymerized residue of a compound having a polymerizable $CH_2 = C<$ group.

In the context of this invention, the most important characteristic of the above polymerization products is that they form stable hydrates which ultimately contain a sufficient amount of bound water capable of providing an excellent degree of inherent plasticization but short of rendering the resultant films thereof unacceptably tacky. A further beneficial property noted for these film formers is that they are highly substantive to hair. Thus, by virtue of the latter property coupled with their stable hydrate forming ability, the hair conditioners of this invention are amenable to application in form of an aqueous lotion or gel. Furthermore, they can be incorporated in shampoos, dye rinses and like compositions as a constituent thereof in order to realize an auxiliary hair setting function after drying the hair.

DESCRIPTION OF THE PREFERRED EMBODIMENTS

In describing the preferred embodiments of this invention, namely, the applicable copolymers of the ethylenically unsaturated trialkylammonium acylimines useful in the practice of this invention, the disclosure will be primarily addressed to methods for preparing said copolymers. The manner whereby such conditioners are incorporated or formulated into any particular cosmetic composition is beyond the essential purview of this invention; since enabling details relative to this aspect are well documented in the prior art. Also, it is to be appreciated that the actual compounding of cosmetic hair preparations is a segment of art unto itself and in which considerable proprietary information comes into play.

There are two types of ethylenically unsaturated trialkylammonium acylimines useful in the practice of this invention each of which can be primarily distinguished in the manner contemplated for the preparation thereof. The two types of monomers include firstly those in which each of the substituents of the tertiary amino nitrogen atom is hydrocarbyl, preferably a lower alkyl group. The foregoing type monomer can be readily prepared by the classical route involving the initial condensation of either acrylic or methacrylic acid chloride with an unsymmetrical dialkyl hydrazine, followed by quarternizing the resultant acid hydrazide and finally treating with a strong base to yield the trialkylammonium acylimine.

The other type includes those in which two of the tertiary amino nitrogen atom substituents are alkyl, again preferably lower alkyl, and the remaining substituent is a hydroxyalkyl group. Details relative to the method applicable for preparing such monomers are set forth in U.S. Pat. No. 3,485,806. Briefly, this method consists of reacting a lower alkyl acrylate or methacrylate with an equivalent of each of an unsymmetrical di-(lower) alkyl hydrazine and an alkylene oxide. The ethylenically unsaturated trialkylammonium acylimines obtained in this manner represent the preferred conditioners. This preference is predicated on the ability of the process to provide an amino nitrogen substituent of variable length substituted in the number two position with an hydroxyl group. Such a substituent materially affects the hydrophilic properties of the resultant monomer and thus a wide latitude is afforded in yielding a monomeric compound having the desired degree of hydrophilic characteristics.

In order to impart the desired degree of hydrophobicity to polymerization products derived from the aforesaid trialkylammonium acylimines, one can utilize a variety of vinyl monomers for this purpose. An enumeration of suitable vinyl monomers useful for copolymerizing with the afore-described trialkylammonium acylimines include the following: the vinyl ethers, e.g., methyl-, ethyl-, propyl-, butyl-, isobutyl-, lauryl-, and stearyl vinyl ether; the vinyl monoacids, e.g., acrylic acid, methacrylic acid and crotonic acid, and including the lower alkyl or hydroxy alkyl esters of said monoacids; the vinylamides, e.g., acrylamide, the N-substituted acrylamides, diacetone acrylamide, and methacrylamide; the vinyl esters, e.g., vinyl acetate, vinyl propionate, vinyl butyrate, and vinyl laurate; the vinyl acetal, e.g., vinyl butyral, etc. Vinyl alcohol likewise represents a suitable monomeric residue in the copolymers contemplated herein. The preferred comonomer for preparing copolymers of the contemplated trialkylammonium acylimines is the one favored by the art for deriving polymeric type hair conditioners, namely, vinyl acetate.

The copolymerization of the ethylenically unsaturated trialkylammonium acylimine with the vinyl comonomer can be carried out in bulk, in solution or in an aqueous system. Solution polymerization is preferred. The solvents preferred for solution polymerization are the lower alkanols or aqueous solutions thereof containing a sufficient amount of the alcohol to maintain solubility throughout the polymerization process. Temperatures as high as about 100°C. can be used in carrying out polymerization without any extensive rearrangement of the aminimide

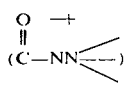

grouping. The preferred temperature operating range is from about 60° to 80°C. The resultant polymers can be advantageously isolated by precipitation from their solutions by addition thereto of a solvent in which the polymer is insoluble. Upon drying the precipitated polymer the product can be formulated into sprays, lotions or gels as desired.

The copolymerization can be effected by heating alone but is preferably initiated through the use of a conventional radical forming initiator. The ratio of the respective comonomers can be varied extensively depending upon the degree of dipolar ion functionality sought for the polymerization product. Thus, the ethylenically unsaturated trialkylammonium acylimine can be employed as the sole monomer to produce a homopolymer or used in an extent whereby the resultant polymerization product contains only about 10 molar percent thereof.

In order to illustrate to those skilled in the art the best mode contemplated for obtaining resinous film formers useful in the practice of the present invention, the following working examples are set forth. As indicated, these examples are presented primarily by way of illustration and accordingly, any enumeration of details contained therein should not be construed as a limitation on the invention except to the extent expressed in the appendant claims. All parts are parts by weight unless otherwise indicated.

EXAMPLE I

In this and the subsequent examples, the ethlenically unsaturated trialkylammonium acylimine employed to prepare copolymers useful as hair conditioners was 1,1-dimethyl)-1-(2-hydroxypropyl)ammonium-N-metharyloylimine (hereinafter referred to as DHA). This monomer was prepared in accordance with the process outlined in Example III of U.S. Pat. No. 3,485,806.

The specific purpose of this example is to illustrate the preparation of a variety of copolymers of DHA and vinyl acetate. Into a suitable reaction vessel equipped with a mechanical stirrer, thermometer, reflux condenser, heating source and nitrogen inlet means was charged with the appropriate mole percentages of DHA and vinyl acetate observed in the respective runs. The solvent in each case was a mixture of water and 2-propanol and such was added to obtain a 50% nonvolatile solution. The solvent mixture in each instance contained the same weight percentile of water as the mole percent of DHA present, e.g., when the monomer mixture was composed of 10 mole % DHA and 90 mole % vinyl acetate, the solvent mixture was correspondingly composed of 10 weight % water and 90 weight % 2-propanol. Upon effecting solution of the comonomers, the solution was degassed with nitrogen for 20 minutes while heating to 70°C. The initiator, 0.03 mole percent azobisisobutyronitrile (AIBN) based on the monomer charge, was added and the reaction mixture heated to reflux. Additional initiator in the amount of 10% of the initial charge was added two hours later. After a total reaction time of seven hours, the reaction mixture was cooled to room temperature. After completion of the polymerization reaction, the respective copolymers were isolated into stirred solvents as indicated in Table I and then collected and dried.

TABLE I

| Run No. | Mole % DHA | Mole % VA | Solvent | Successive Wash Solvent |
|---|---|---|---|---|
| 1 | 5 | 95 | H₂O | H₂O |

TABLE I-Continued

| Run No. | Mole % DHA | Mole % VA | Solvent | Successive Wash Solvent |
|---|---|---|---|---|
| 2 | 10 | 90 | ether | ether |
| 3 | 20 | 80 | ether | 50% ether-acetone |
| 4 | 30 | 70 | acetone | — |
| 5 | 40 | 60 | acetone | acetone |
| 6 | 50 | 50 | acetone | acetone |
| 7 | 60 | 40 | acetone | acetone |
| 8 | 70 | 30 | acetone | acetone |

EXAMPLE II

This example illustrates the preparation of copolymers of DHA and vinyl alcohol.

Into a suitable reaction vessel equipped as in Example I were charged 40 parts of the selected DHA-VA copolymer, 30 ml of methanol and the polymer solution was then heated to a gentle reflux. A solution (24 ml) of 5 percent sodium in methanol was slowly added to the reaction mixture and reflux continued for 24 hours. The reaction mixtures were concentrated at reduced pressure and isolated in the solvents shown in the following Table II.

TABLE II

| Run No. | Mole % DHA | Mole % Vinyl Alcohol | Solvent | Successive Wash Solvent |
|---|---|---|---|---|
| 2a | 10 | 90 | acetone | acetone |
| 3a | 20 | 80 | acetone | acetone |
| 4a | 30 | 70 | 25% acetone-75% ether | acetone |
| 5a | 40 | 60 | 75% acetone-25% ether | acetone |
| 6a | 50 | 50 | 50% acetone-50% ether | acetone |
| 7a | 60 | 40 | 25% acetone-75% ether | — |
| 8a | 70 | 30 | ether | — |

EXAMPLE III

This example illustrates the preparation of a DHA-vinyl butyral copolymer.

Into a suitable reaction vessel equipped as in the previous examples were charged 1.29 moles of the 50 mole % DHA-vinyl alcohol copolymer of Example II, 2 liters of water and 240 ml of methanol. The pH of the reaction mixture was adjusted to approximately 5 with conc. H₂SO₄ and then slowly heated to 70°C. Butanol (1.1 mole) was rapidly added dropwise. After 4 hours the reaction temperature was cooled to and held at 60°C. for one hour and thereupon allowed to cool to room temperature. The cooled reaction mixture was neutralized with aqueous caustic. After removing the solvent at reduced pressure, the viscous polymeric solution was isolated in acetone and the filtered polymer washed with acetone and dried.

EXAMPLE IV

This example illustrates the preparation of a commercial type of hair spray conditioning composition employing one of the DHA/vinyl acetate copolymers described in Example I. The formulation was as follows:

| | | Parts |
|---|---|---|
| 1. | DHA/VA copolymer (70/30 ratio) as a solution of 40% solids in ethanol | 3.0 |
| 2. | Dimethyl Phthalate | 0.13 |
| 3. | Anhydrous Ethanol | 30.0 |
| 4. | Freon-11 | 6.0 |
| 5. | Freon-12 | 7.0 |

The process of compounding the above formulation consisted of adding components 1, 2, and 3 to a pressure container whereupon the pressure seal assembly was tightened and 4 and 5 added in such order.

I claim:

1. A process for conditioning and setting hair which comprises applying to the hair in an effective amount for imparting set to the hair of a resinous film-forming component consisting essentially of addition polymerization product selected from the group consisting of a homopolymer of an ethylenically unsaturated trialkylammonium acylimine of the formula:

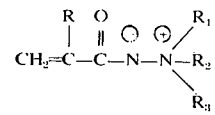

in which R is H or CH₃; R₁ and R₂ are each alkyl, and R₃ is alkyl or hydroxyalkyl; and a copolymer of said trialkylammonium acylimine and a comonomer selected from the group of a vinyl ether, a vinyl monocarboxylic acid, a lower alkyl or hydroxyalkyl ester of a vinyl monocarboxylic acid, a vinyl amide, a vinyl alkanoate, vinyl alcohol and mixtures thereof, in admixture with a cosmetically acceptable carrier; said product being highly substantive to hair and forming stable hydrates with water.

2. The process of claim 1 wherein the addition polymerization product is a copolymer of said trialkylammonium acylimine and a comonomer selected from the group consisting of a vinyl ether, a vinyl monocarboxylic acid, a lower alkyl or hydroxyalkyl ester of a vinyl monocarboxylic acid, a vinyl amide, a vinyl alkanoate, and mixtures thereof.

3. The process of claim 2 wherein said comonomer is a vinyl alkanoate.

4. The process of claim 3 wherein said vinyl alkanoate is vinyl acetate.

5. The process of claim 4 wherein said trialkylammonium acylimine is a 1,1-dialkyl-1-(2-hydroxyalkyl)ammonium-N-methacryloylimine.

6. The process of claim 5 wherein said trialkylammonium acylimine is a 1,1-dimethyl-1-(2-hydroxyalkyl)ammonium-N-methacryloylimine.

7. The process of claim 6 wherein said trialkylammonium acylimine is 1,1-dimethyl-1-(2-hydroxypropyl)ammonium-N-methacryloylimine.

* * * * *